(12) United States Patent
Hill et al.

(10) Patent No.: US 7,702,135 B2
(45) Date of Patent: Apr. 20, 2010

(54) SYSTEM AND METHOD FOR IMAGE MONITORING

(75) Inventors: David Hill, Raby Bay (AU); Ben Davies, Greenslopes (AU); James Thurston, Victoria Point (AU)

(73) Assignee: Moreton Bay Corporation Pty Ltd., Nunawading, Victoria (AU)

( * ) Notice: Subject to any disclaimer, the term of this patent is extended or adjusted under 35 U.S.C. 154(b) by 933 days.

(21) Appl. No.: 10/574,674

(22) PCT Filed: Oct. 8, 2004

(86) PCT No.: PCT/AU2004/001377

§ 371 (c)(1),
(2), (4) Date: Apr. 4, 2006

(87) PCT Pub. No.: WO2005/034060

PCT Pub. Date: Apr. 14, 2005

(65) Prior Publication Data

US 2007/0132849 A1    Jun. 14, 2007

(30) Foreign Application Priority Data

Oct. 9, 2003    (AU) ............................... 2003905506

(51) Int. Cl.
*G06K 9/00* (2006.01)
*H04N 7/18* (2006.01)

(52) U.S. Cl. .................. 382/107; 382/204; 382/256; 382/257; 382/111; 382/104; 340/541; 348/159; 348/152; 348/153; 348/155

(58) Field of Classification Search .................. 382/107, 382/115, 103, 159, 204, 256, 257, 258, 259, 382/111, 104, 11; 348/158, 159, 153, 154, 348/155, 143, 151, 152; 340/541
See application file for complete search history.

(56) References Cited

U.S. PATENT DOCUMENTS 6,476,858 B1 * 11/2002 Diaz et al. .................. 348/159
6,493,022 B1 * 12/2002 Ho et al. ..................... 348/154

(Continued)

FOREIGN PATENT DOCUMENTS

CA    2242322    *    1/2000

(Continued)

*Primary Examiner*—Wesley Tucker
*Assistant Examiner*—Nancy Bitar
(74) *Attorney, Agent, or Firm*—Harness, Dickey & Pierce, P.L.C.

(57) ABSTRACT

An image monitoring system uses wireless communications to transmit images for security monitoring. The system includes a central controller (105) and a plurality of digital still camera units (110) operatively connected to the central controller (105). At least one of the camera units (110) includes an image sensor (215), a motion detector (220) that causes the image sensor (215) to receive image data when motion is detected, a micro controller (205), and a first non-volatile memory operatively connected to or included in the micro controller (205). The micro controller (205) determines whether received image data should be transmitted to the central controller (105), and the central controller (105) determines whether received image data should be transmitted to a monitoring station (115). The camera units (110) may further be used as standalone units as replacements for motion detectors in existing security systems.

11 Claims, 9 Drawing Sheets

U.S. PATENT DOCUMENTS

| | | | |
|---|---|---|---|
| 7,131,136 B2 * | 10/2006 | Monroe | 725/105 |
| 7,286,489 B2 | 10/2007 | Ades | |
| 7,529,411 B2 * | 5/2009 | Haupt et al. | 382/220 |
| 2003/0174210 A1 | 9/2003 | Vimpari et al. | |

FOREIGN PATENT DOCUMENTS

| | | |
|---|---|---|
| CA | 2242322 C | 10/2001 |
| GB | 2 258 579 | 2/1993 |
| WO | WO 00/68908 | 11/2000 |
| WO | WO 01/82255 | 11/2001 |
| WO | WO 02/01877 | 1/2002 |
| WO | WO 02/095702 | 11/2002 |
| WO | WO 03/043316 | 5/2003 |

* cited by examiner

SYSTEM AND METHOD FOR IMAGE MONITORING

FIELD OF THE INVENTION

The invention relates to obtaining and monitoring digital images. In particular, although not exclusively, the invention relates to an improved security system and method for obtaining automatic, sequential digital still images using power efficient cameras and for processing the images to determine whether an anomalous event has occurred.

BACKGROUND TO THE INVENTION

Video image monitoring systems such as security systems are increasingly common as the costs of cameras and image processing and communications technologies decrease. Often such systems include several cameras connected to a bank of video monitors overseen by a security guard. These systems suffer from limitations however as the number of cameras increases. First, wiring both power and data cables to each of the cameras significantly increases costs and complexity. Second, the amount of data received and recorded by a system frequently becomes unmanageable. Third, the ability to monitor simultaneously all of the cameras decreases, resulting in a higher probability that an anomalous event such as a security breach will go unnoticed.

Further, individual cameras of existing video security systems generally require wired connections to both a mains power supply and to a device for receiving and recording images such as a video recorder. Such existing cameras are thus prohibitively expensive and impractical for many applications where easy access to such wired connections is unavailable.

There is therefore a need for an improved image monitoring system and method that overcomes the above limitations.

SUMMARY OF THE INVENTION

Therefore an object of the present invention is to overcome or at least alleviate one or more of the above limitations.

Accordingly, in one form, although it need not be the only or indeed the broadest form, the invention resides in an image monitoring system comprising a central controller and a plurality of digital still camera units operatively connected to the central controller, wherein at least one of the camera units comprises: an image sensor; a motion detector operatively connected to the image sensor that causes the image sensor to receive image data when motion is detected; a micro controller operatively connected to the image sensor and to the motion detector; a first nonvolatile memory operatively connected to or included in the micro controller; and computer readable program code stored on the first memory for causing the micro controller to determine whether the received image data should be transmitted to the central controller, wherein the central controller then determines whether the received image data should be transmitted to a monitoring station.

The plurality of camera units may transmit image data wirelessly to the central controller.

The central controller may further comprise a mesh networking protocol enabling image data to be routed indirectly and wirelessly through one or more of the camera units to the central controller.

At least one of the camera units may further comprise a microphone.

At least one of the camera units may further comprise both a colour and a black and white image sensor to improve low-light sensitivity, wherein both image sensors are operatively connected to a single high-speed DMA bus.

At least one of the camera units may be battery operated and comprise direct memory access circuitry between an image sensor and a second nonvolatile memory.

At least one of the camera units may include a pre-trigger feature that, following a detection of motion by the motion detector, transmits to the central controller a series of buffered images captured before the detection of motion.

The monitoring station may form a component of the image monitoring system, and the monitoring station may include human personnel who further analyze the images to determine whether an alarm should be sent to an authority.

According to another form, the invention is a method for image monitoring using a plurality of camera units operatively connected to each other and to a central controller using wireless communications, the method comprising the steps of: detecting motion of a moving object using a motion detector included in at least one of the camera units; triggering, following the detection of motion of the moving object, an image sensor included in at least one of the camera units to receive an image of the moving object; determining whether the received image should be transmitted wirelessly to the central controller by analyzing the image using a micro controller included in at least one of the camera units and operatively connected to the image sensor; and determining whether any images received at the central controller from at least one of the camera units should be transmitted to a monitoring station.

The central controller may further comprise a mesh networking protocol enabling image data to be routed indirectly and wirelessly through one or more of the camera units to the central controller.

The method may further comprise the step of storing images received by the image sensor in a memory unit of a camera unit using direct memory access.

The step of triggering an image sensor may comprise triggering a black and white image sensor in low light conditions, and otherwise triggering a colour image sensor, wherein at least one camera unit includes both the colour image sensor and the black and white image sensor operatively connected to a single high-speed DMA bus.

The method may further comprise a pre-trigger feature including the steps of: continuously receiving images from the image sensor; storing the received images in a memory buffer of at least one camera unit; and following a detection of motion by the motion detector, transmitting to the central controller a series of the stored images received before the detection of motion.

According to yet another form, the invention is a camera unit for image monitoring comprising: an image sensor; a motion detector operatively connected to the image sensor that causes the image sensor to receive image data when motion is detected; a micro controller operatively connected to both the image sensor and the motion detector; first and second nonvolatile memories operatively connected to the micro controller, a random access memory operatively connected to the micro controller and, through a high-speed DMA bus, to the image sensor; and computer readable program code stored in the first nonvolatile memory for causing the micro controller to transfer received image data directly from the image sensor to the second nonvolatile memory over the high-speed DMA bus.

The second nonvolatile memory may be a removable flash memory card.

The camera unit may further comprise a battery for supplying power to the unit.

The camera unit may further comprise an electrical interface operatively connected to the motion detector, wherein the interface is adapted to receive a passive PIR motion detector connector from a security alarm system, wherein the camera unit replaces a passive PIR motion detector of the security alarm system.

The second nonvolatile memory may include a settings file, whereby when the second nonvolatile memory is removed from the camera unit and inserted into a reader connected to a computer, a setup software program on the computer enables configuration of camera unit features, which features are then loaded into the camera unit when the second nonvolatile memory is re-inserted into the camera unit.

At least one of the camera unit features may be selected from the group consisting of time and date stamping, erasing image data, image sequencing, image resolution, time lapse mode, pre-trigger mode, scheduler, encryption/decryption, image capture on arm/disarm, text overlay, enable LED, enable motion sensor, and relay output polarity.

Further features of the present invention will become apparent from the following detailed description.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein like reference numbers refer to like elements throughout the various views, in which.

DETAILED DESCRIPTION OF THE INVENTION

Figure 1:
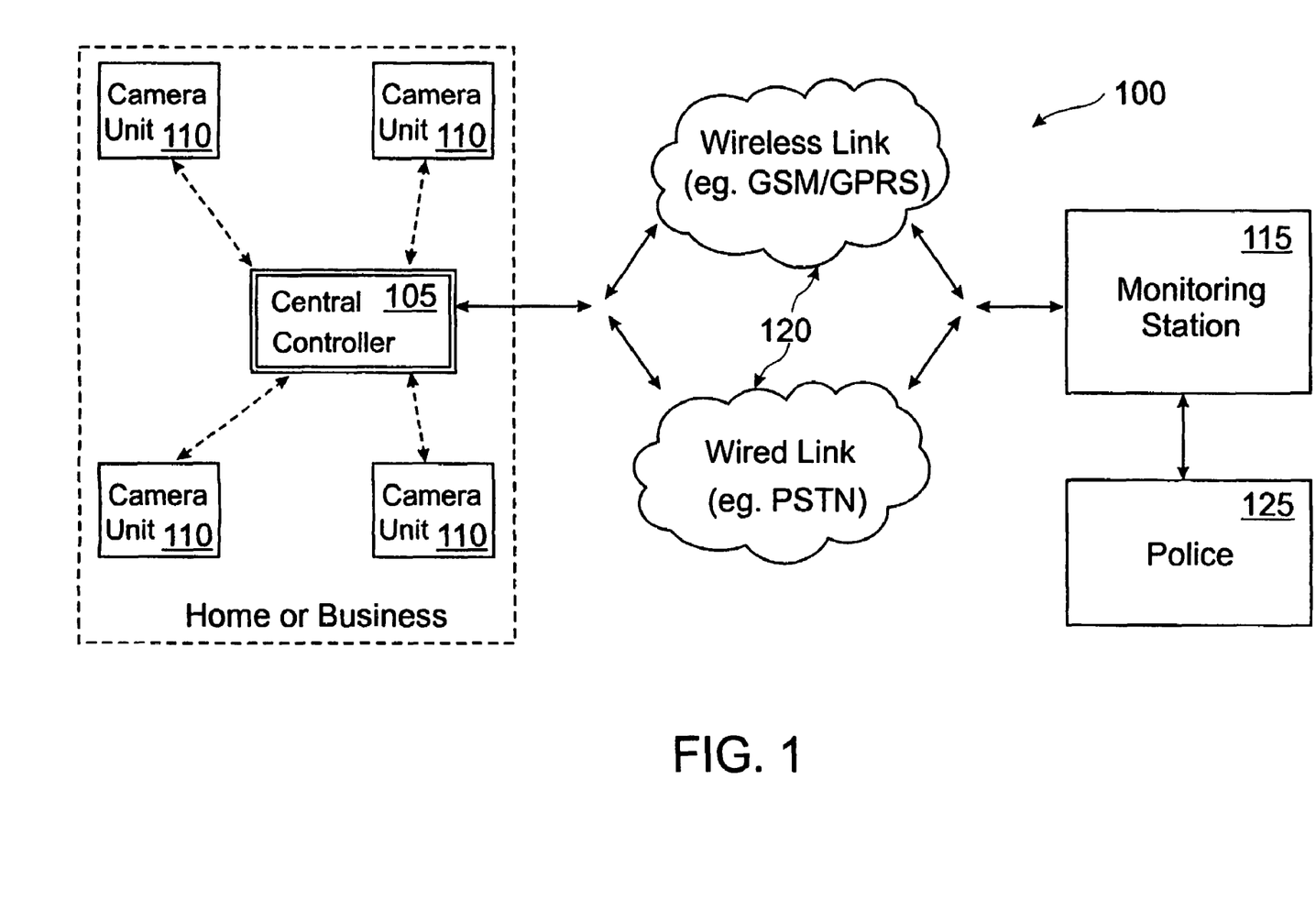
FIG. 1 is a schematic block diagram of an image monitoring system according to an embodiment of the present invention.

Referring to FIG. 1, there is illustrated a schematic block diagram of an image monitoring system 100 according to an embodiment of the present invention. The system 100 includes a central controller 105 in wireless communication with a plurality of camera units 110. The central controller 105 is connected to a monitoring station 115 through a wired or wireless network 120. The monitoring station 115 in turn may be linked to authorities 125 such as the police.

The system 100 thus enables images from the camera units 110 to be wirelessly communicated to the central controller 105 where they are analyzed and, if warranted, some or all of the images or data related to the images are transferred to the monitoring station 115. The monitoring station 115, which may be manned or unmanned, then provides further analysis of the images and/or data and determines whether an alarm should be sent to the authorities 125.

Figure 2:
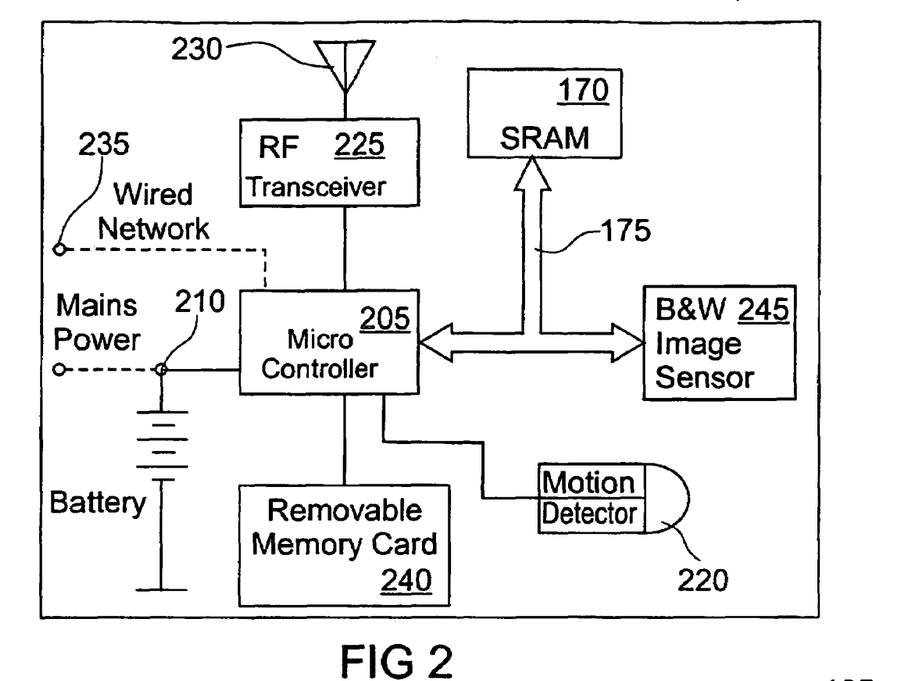
FIG. 2 a schematic block diagram of a wireless camera unit according to an embodiment of the present invention.

Referring to FIG. 2, there is illustrated a schematic block diagram of a wireless camera unit 110. The camera unit 110 comprises a micro controller 205 connected to a power supply. Ideally, the power supply is a battery 210 such that there is no need for connecting power supply wires to the camera unit 110; however, if a mains power outlet is conveniently located near a camera unit 110, mains power also can be used as a power supply. A removable memory card is connected to the micro controller 205. Further, a memory such as an SRAM memory 170 and an image sensor such as a black and white image sensor 245 is connected to the micro controller 205 via a high-speed Direct Memory Access (DMA) bus 175, as explained in more detail below. A motion detector 220 such as a pyro electric infrared-detector may also be connected to the micro controller 205. Further, an I/O port of the micro controller 205 is connected to an RF transceiver 225, including an antenna 230, for communicating with the central controller 105 and/or with other camera units 110 or a remote control, as discussed further below. If a wired network is located near the camera unit 110, the micro controller 205 could also be connected to a wired network 235. The micro controller 205 may also function to compress images before images are transmitted to the central controller 105.

Figure 3:
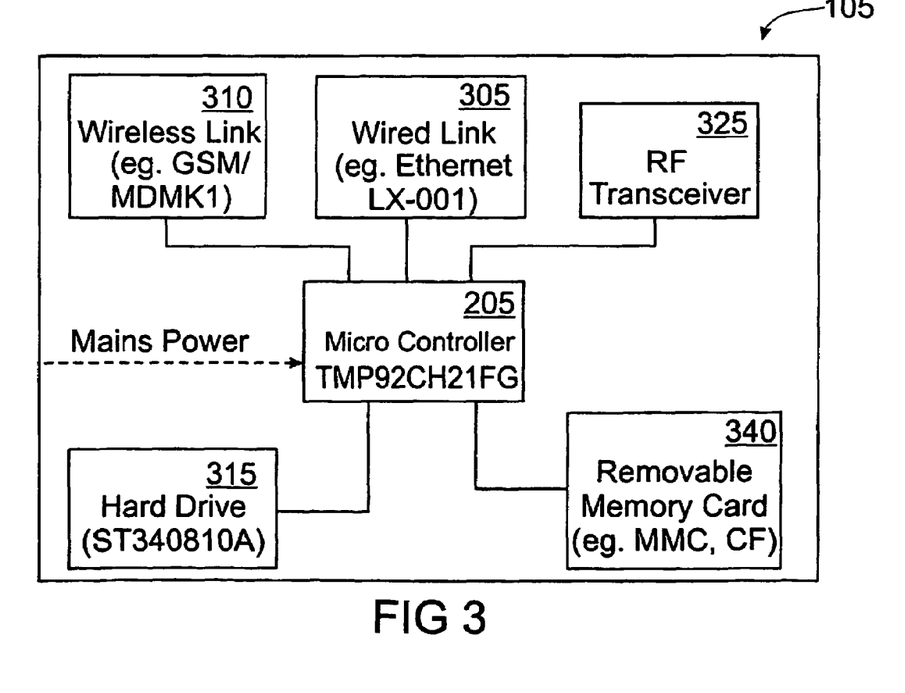
FIG. 3 is a schematic block diagram of a central controller according to an embodiment of the present invention.

Referring to FIG. 3, there is illustrated a schematic block diagram of the central controller 105. The central controller 105 includes a central micro controller 305 connected to a hard drive 315 and to a removable memory card 340. The central micro controller 305 is also connected to an RF transceiver 325 for receiving wireless signals from the RF transceivers 225 of the camera units 110. The central micro controller 305 is also connected to wired link 305 or wireless link 310 for communicating with the monitoring station 115.

The present invention is therefore able to minimize the number of false alarms that are reported to the authorities 125 by using a series of filtering events. First, a camera unit 110 will generally not report images to the central controller 105 unless the camera unit 110 has first detected motion. Motion may be detected by a camera unit 110 either by a motion detector 220 or through analysis of a series of still images conducted by the micro controller 205. In the latter case, using image analysis software that is well known in the art, by detecting whether features between successive images from a given camera unit 110 change, the micro controller 205 can determine whether motion has been detected by its associated image sensor 215.

Second, software associated with the central controller 105 may perform a preliminary analysis of the motion that has been recorded by a camera unit 110. For example, the central controller 105 may be programmed to ignore certain types of motion that are anticipated by the system 100 and that should not result in the issuance of an alarm. Such anticipated motions may include for example the operation of machinery or the regularly scheduled patrols of a security guard. Thus the central controller 105 may be programmed to analyze sequential motion detections captured by several camera units 110. For example, a security guard on patrol may be expected to trigger first, second and third cameras sequentially during a predefined time period. The system 100 could be programmed to ignore such anticipated triggering events. For example, such anticipated events could be filtered at the individual cameras which could be programmed not to report such events to the central controller 105; or the central controller 105 could be programmed to filter such events and not report them to the monitoring station 115. However, if the above described anticipated sequence of the triggered camera units 110 changed, or for example if the timing of such a sequence changed, the central controller 105 could be programmed to report an anomalous event to the monitoring station 115.

Third, the monitoring station 115 may apply a final filter of the recorded motion before issuing an alarm to the authorities 125. For example, a security guard may monitor the monitoring station 115. The security guard could therefore make a judgment concerning whether an anomalous event reported by the central controller 105 warranted issuing an alarm to the authorities 125. Alternatively, the monitoring station 115 could be unmanned; in which case the monitoring station 115 could include additional processing algorithms for interpreting an anomalous event reported by the central controller 105. Depending on the output of the processing algorithm, the monitoring station 115 could issue an automated alert to the authorities 125.

The above-described multi-tiered filtering process concerning anomalous events also functions to reduce costs associated with the system 100. Costs are reduced because the most expensive analysis processes and hardware may be highly centralized; whereas the less expensive analysis processes and hardware may be widely distributed. For example, expensive analysis processes that require a human analyst such as a security guard or expensive processing equipment may be centralized in a single monitoring station 115. The single monitoring station 115 could be used to monitor dozens or even thousands of homes or businesses. Each home or business could then include one central controller 105 that would monitor inputs from numerous camera units 110. The analysis capabilities of the central controllers 105, although not as sophisticated as the capabilities of the monitoring station 115, would in turn be more sophisticated than the individual camera units 110.

Further the link between the central controller 105 and the monitoring station 115 may include access to the internet or other wireless networks such that users of the system may take advantage of existing communications infrastructures. Thus users of the system 100 could monitor outputs of either the central controller 105 or the monitoring station 115 through internet-enabled personal computers or through wireless devices such as mobile phones or personal digital assistants (PDAs).

Therefore each home or business connected to the system 100 is able to take advantage of a sophisticated filtering process that minimizes false alarms reported to authorities 125 and that also shares with other homes and businesses the costs of analyzing anomalous events. Thus the cost of the system to each individual home or business is significantly reduced.

The costs of the system 100 may also be decreased, and the convenience of the system 100 increased, by reducing the power consumption of the individual camera units 110. By making the camera units 110 wireless and by powering them with long-life batteries, the camera units 110 may be easily installed in remote areas such as around outdoor fence perimeters.

According to the present invention, the power consumption of a camera unit 110 may be dramatically reduced by first recording still images rather than video. A still image camera uses much less power than a video camera. However, the present invention is able to achieve most of the security benefits of live video by timing the still images reasonably close together and by using image analysis software to detect changes between sequentially recorded still images. As mentioned above, such image analysis software may be used to detect simple motion, or may be used to detect pre-defined anomalous events such as the presence of a person in a particular portion of an image such as near a fence line.

The rate at which images are captured by a given camera unit 110 may depend on the location of the camera and the nature of anomalous events that the camera is intended to detect. For example, a camera unit 110 with a far field of view could be set at a low image capture frequency because it would require a relatively long time for an object to pass across the camera unit's field of view. On the other hand a camera unit 110 with a near field of view, or a camera unit that is intended to detect fast moving objects, would be set at a higher image capture frequency.

Figure 4:
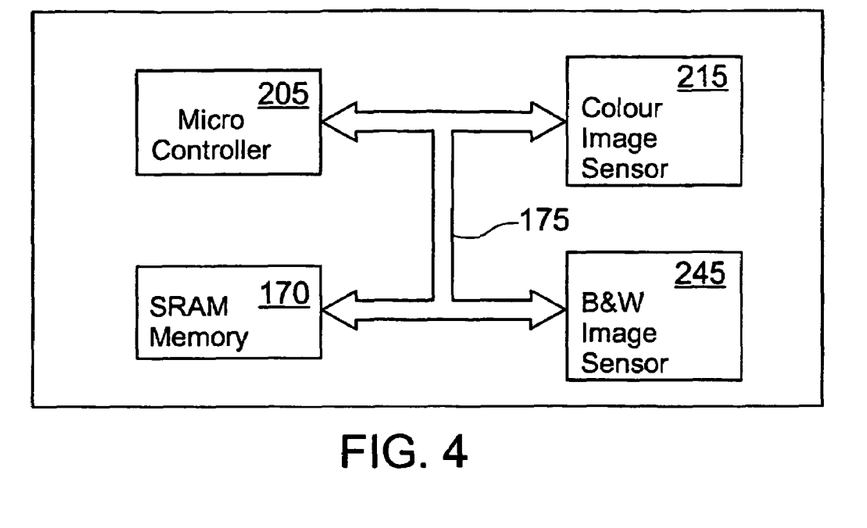
FIG. 4 is a schematic block diagram of components of a camera unit illustrating the use of high-speed DMA inputs according to an embodiment of the present invention.

Power consumption of a camera unit 110 may also be reduced through the use of high-speed Direct Memory Access (DMA) bus 175 connecting the micro controller 205 and other components such as the SRAM 170 and image sensors 215, 245. Referring to FIG. 4, there is a schematic block diagram of components of a camera unit 110 illustrating the use of such a high-speed DMA bus 175. (High-speed DMA refers generally to DMA involving data transfer rates greater than 24 Mbps.) In most standard digital still cameras, image data must pass from an image sensor through a control bus to an image processing ASIC. Only the image processing ASIC is able to then write the image data into memory. Such image processing ASICs are a hard-wired and power intensive means of transferring image data from an image sensor to memory. However, in the present invention that uses DMA, rather than forcing all I/O to and from the memory 240 to pass through an image processing ASIC, the image sensors 215, 245 are able to write image data directly to a SRAM memory 170 across a DMA bus 175 and then to the removable memory card memory 240. DMA thus eliminates the need for an image processing ASIC and therefore reduces the power consumption and costs of the camera unit 110.

Alternative embodiments of the camera unit 110 may be designed to operate without a wireless connection to a central controller 105. In such standalone camera embodiments the RF transceiver 225 and antenna 230 are unnecessary and can be eliminated, further simplifying the camera unit 110 and reducing costs. Camera units 110 designed for stand-alone operation are highly cost effective alternatives for video monitoring. For example by simply fixing a stand-alone camera unit 110 in a location having a desired field of view, one can easily monitor remote facilities such as vehicles, sheds, fence lines or other remote areas. In standby mode a stand-alone camera unit 110 draws very little power so it can be operated on a single battery 210 for weeks or months at a time. The unit 110 can be programmed to capture a series of still images at any frequency for a predetermined time period after activation of the motion detector 220. The images are then stored locally on the removable memory card 240. A user may then simply retrieve the memory card 240 at his or her convenience and download and review the images using a computer or other viewing means.

Stand-alone camera units 110 without wireless communication capabilities are also ideal for upgrading basic prior art motion detectors that are installed in existing security systems. Most installed home security systems do not include video or image capture capability, rather they rely on motion detectors or electrical circuit break points to trigger an alarm. The existing motion detectors can be easily and inexpensively replaced however by the stand alone camera units 110 of the present invention. The motion detection and alarm triggering features of the existing detectors remain fully enabled by the camera units 110, but the older security system then possesses the additional capacity to capture and store images when an alarm is triggered. After an alarm is triggered a homeowner for example can simply retrieve the memory card 240 from the camera unit 110 and download images of the alarm triggering event.

Other features of an embodiment of the present invention are now described below including the use of a mesh networking protocol, pre-trigger buffering, full duplex remote control, and improved low-light imaging.

Figure 5:
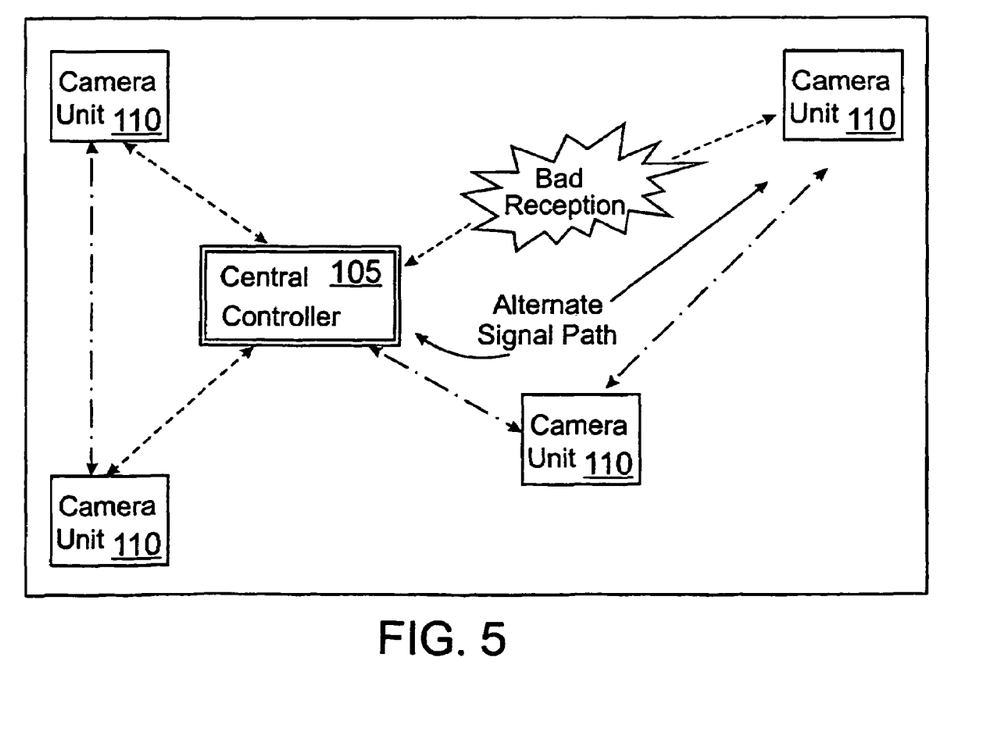
FIG. 5 is a schematic block diagram of a central controller and four camera units wherein bad wireless reception exists between one of the camera units and the central controller according to an embodiment of the present invention.

Referring to FIG. 5, there is illustrated a schematic block diagram of a central controller 105 and four camera units 110 wherein bad wireless reception exists between one of the camera units 110 and the central controller 105. The present invention may employ a mesh networking protocol whereby image and/or control data can be sent either directly between a camera unit 110 and a central controller 105, or such data may be routed indirectly through one or more camera units 110 to and from the central controller 105. According to networking techniques well known in the art, and thus not required to be repeated in detail here, a mesh networking protocol of the present invention may be programmed to switch automatically between various alternative paths depending on reception quality. Camera units 110 may also be programmed to relay data from remote camera units 110 to extend the active range of the system 100, without having to increase the power of the RF transceivers 225.

Figure 6:
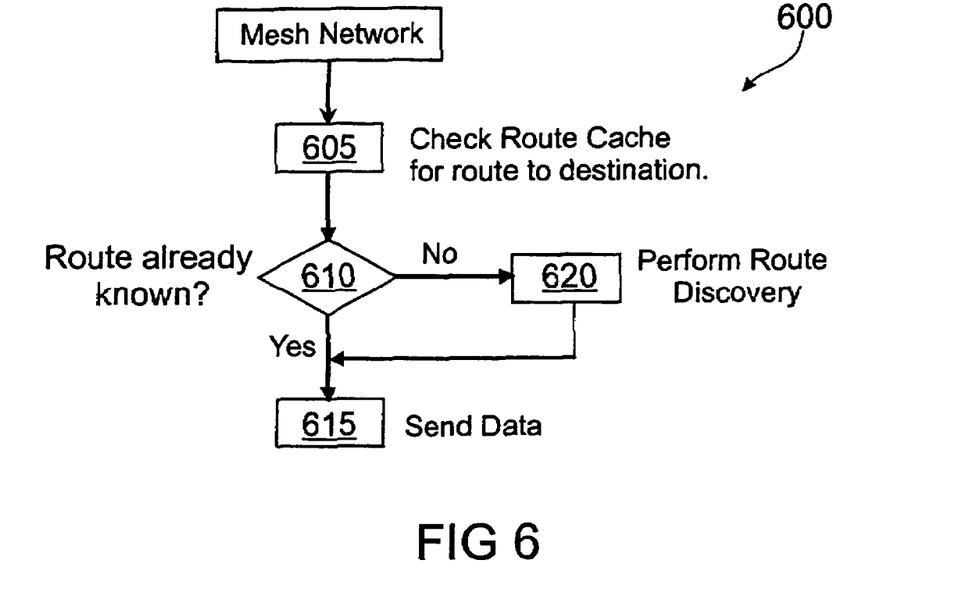
FIG. 6 is a flow diagram illustrating a method of operating a mesh network according to an embodiment of the present invention.

Referring to FIG. 6, there is a flow diagram illustrating a method 600 of operating a mesh network according to the present invention. The method 600 begins at step 605 that checks a route cache to determine whether a route exists between two points in the network. At step 610, if a route is known, the method 600 proceeds to step 615 where data is sent to its destination. However, if at step 610 a route between the two points does not exist in the route cache, the method 600 proceeds to step 620 where a route discovery algorithm is executed. After a route is discovered, the method 600 proceeds to step 615 where data is sent to its destination.

Figure 7:
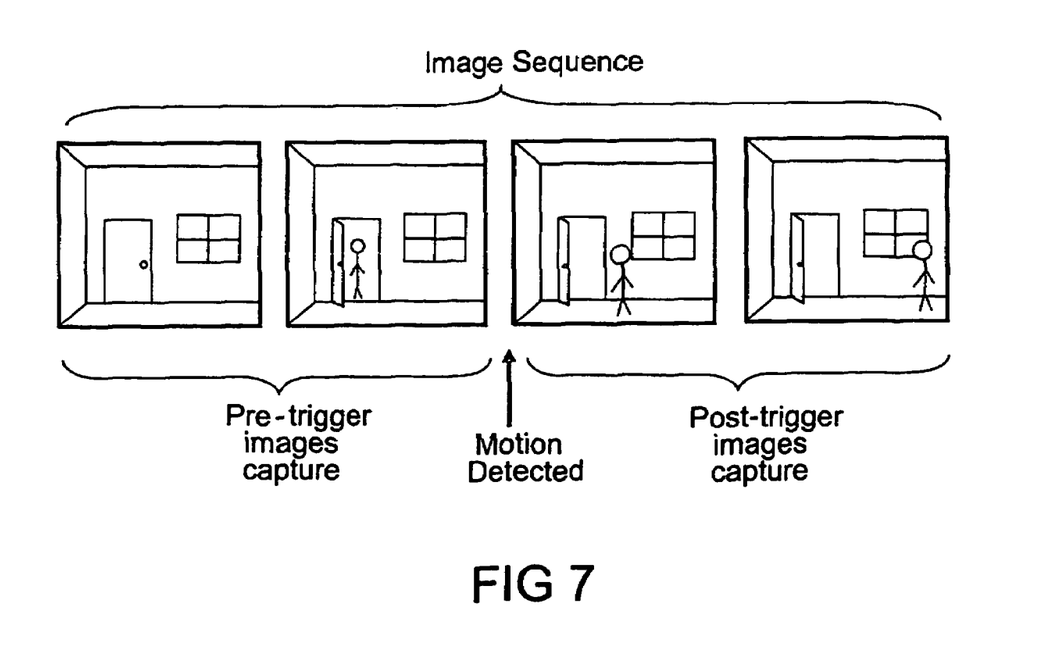
FIG. 7 is a timing diagram illustrating a pre-rigger feature according to an embodiment of the present invention.

Referring to FIG. 7, there is a timing diagram illustrating a pre-trigger feature of the present invention. According to the pre-trigger feature, the camera units 110 store intermittent images in a RAM buffer such that when an anomalous event is detected by a motion detector 220, the related micro controller 205 transmits a present image from the image sensor 215 to the central controller 105 and also transmits a select number of previously buffered images to the central controller 105. In this manner, the method of the present invention is able to capture a series of events preceding a triggering event, enabling a more comprehensive temporal analysis of a situation.

Figure 8:
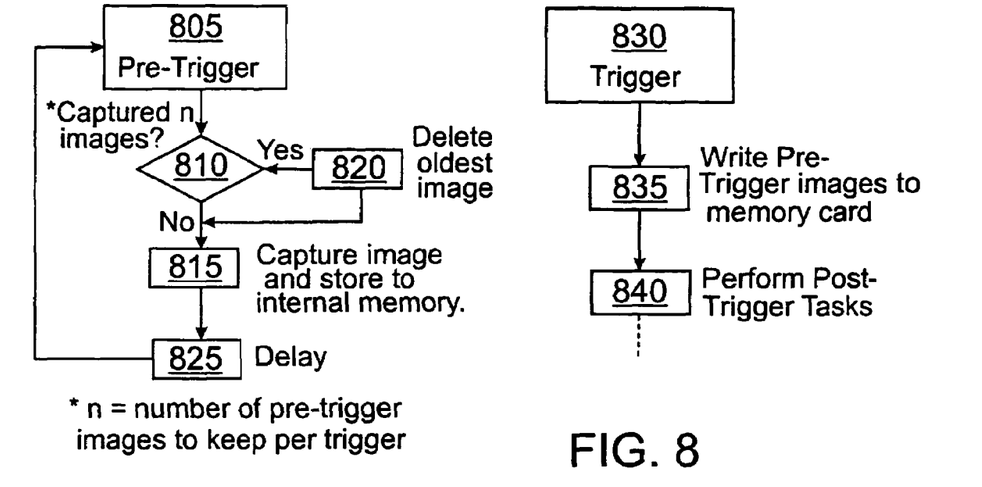
FIG. 8 is a flow diagram illustrating a method for maintaining a pre-trigger buffer and for writing images to a memory card following a triggering event according to an embodiment of the present invention.

Referring to FIG. 8, there is a flow diagram illustrating a method 800 for maintaining a pre-trigger buffer and for writing images to a memory card 240 following a triggering event. The method 800 begins at step 805 where a pre-trigger image is recorded. At step 810 it is determined whether a pre-set number of n images have been captured in the pre-trigger buffer of an internal memory 240, where n is determined by the size of the buffer and the resolution of the buffered images. If n images have not been captured in the buffer, the present image is added to the buffer at step 815; however if n images have been captured in the buffer then the method 800 proceeds to step 820 where the oldest image in the buffer is deleted before the present image is added to the buffer at step 815. Next, a delay step 825 is introduced to space the images by a preset time interval, as discussed above concerning image capture frequency, before the method 800 returns to step 805 to capture the next image. If a triggering event occurs at step 830, all of the pre-trigger images in the buffer are copied at step 835 from the internal memory 240 to the central controller 105. Finally, at step 840 other post-trigger tasks are performed such as transmitting other data such as sound data to the central controller 105 and resetting the trigger.

Figure 9:
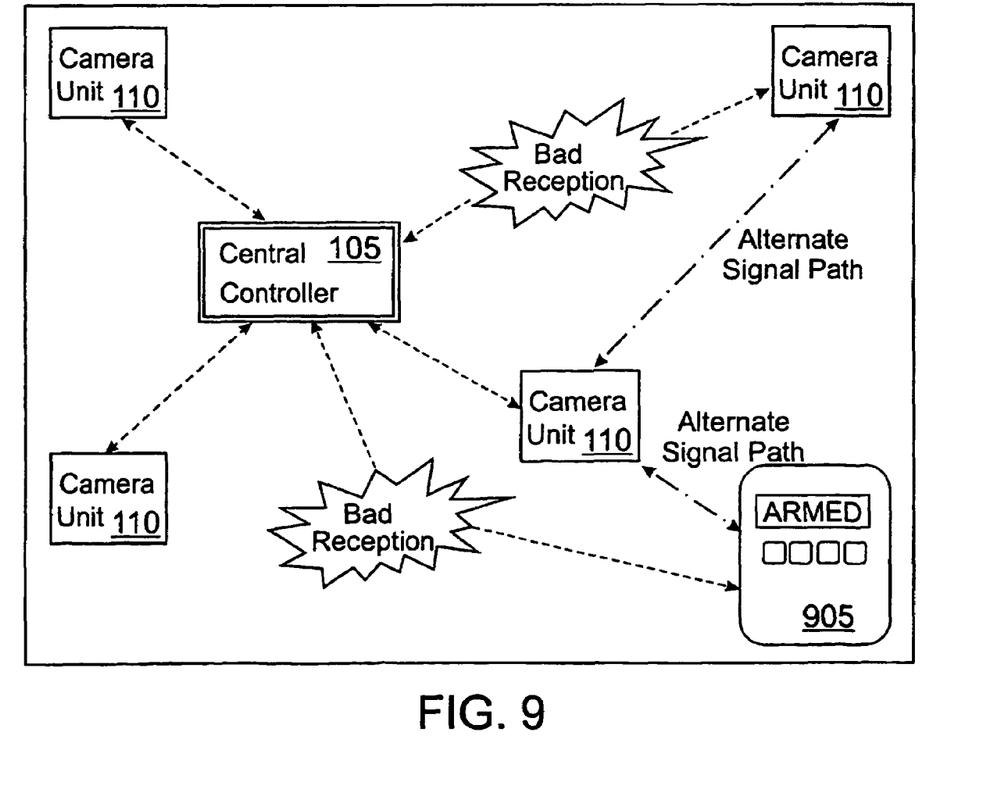
FIG. 9 is a schematic block diagram illustrating a bi-directional (full duplex) remote control for arming and disarming the system according to an embodiment of the present invention.

Referring to FIG. 9, there is a schematic block diagram illustrating a bi-directional (full duplex) remote control 905 for arming and disarming the system 100. Using the mesh networking protocol described above, each camera unit 110 in the system 100 may act as a receiver for the full duplex remote control 905 whereby arm/disarm and other commands may be transferred via the network to the central controller 105. A link from the network to the remote control 905 may also be used to display the status of the alarm system on a graphical user interface of the remote control 905.

Figure 10:
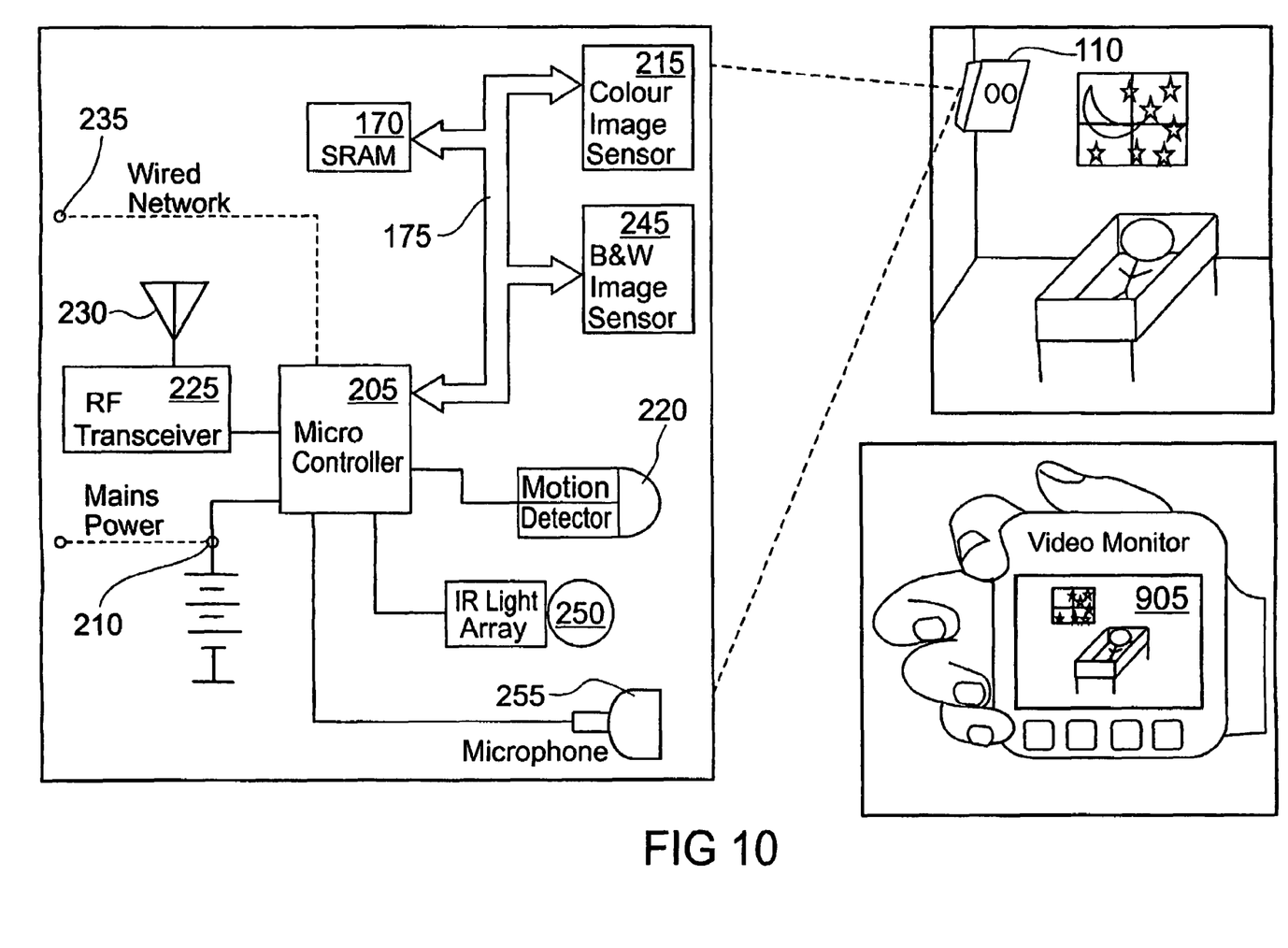
FIG. 10 is a schematic block diagram illustrating a camera unit incorporating both a black and white image sensor and a colour image sensor according to an embodiment of the present invention.

Still another feature of an embodiment the present invention concerns improving the low-light sensitivity of the camera units 110. Referring to FIG. 10, there is a schematic block diagram illustrating a camera unit 110 incorporating both a black and white image sensor 245 and a colour image sensor 215. Normally, in low light conditions, colour image sensors do not respond well and produce poor quality images. Black and white image sensors are generally more sensitive and produce better quality images in low-light conditions. Further, the quality of such black and white images can be enhanced through the use of an infrared (IR) light array 250 that provides supplementary IR illumination of a scene.

As the ambient light falls below a pre-determined threshold, the micro controller 205 switches from the colour image sensor 215 to the black and white image sensor 245 and simultaneously activates the IR light array 250. The camera unit 110 may further include a microphone 255 for monitoring activity in a low-light environment. As illustrated in FIG. 10, the low-light sensitivity of the camera units 110 may thus be ideal for monitoring a dark room such as where a baby is sleeping. An output of the low-light camera unit 110 could then be routed to a portable video display such as a graphical user interface on the remote control 905.

Further, in conventional digital cameras, the image sensor is directly connected to an Application Specific Integrated Circuit (ASIC) that processes the image data into a form that can be stored and displayed. Such ASIC hardware processing is very power intensive (~8 times that of a microcontroller) and ASICs are quite expensive (~3 times the cost of an image sensor). Thus according to the prior art, if two image sensors were to be used in a single camera—such as a colour sensor 215 and a black and white sensor 245 as described above—then it would require 2 ASICs to process the resulting data and this would double the cost and the power consumption. However, the present invention reduces both cost and power consumption by connecting the colour and the black and white image sensors 215, 245 directly onto a high speed DMA bus 175, which in turn connects to the microcontroller 205 and an SRAM memory 170. The microcontroller software then controls the timing of the bus 175 in such a manner that when each sensor 215, 245 is selected individually, data is free to flow to either the memory 170 or the microcontroller 205 without any bus contention. Data is thus stored firstly in the SRAM 170 and then later transferred via the same bus 175 to the microcontroller 205 for software processing of the image. The present technique of connecting two image sensors 215, 245 directly to a high-speed memory bus 175 and controlling them via a DMA function results in low power, low cost and high-speed image data processing.

Figure 11:
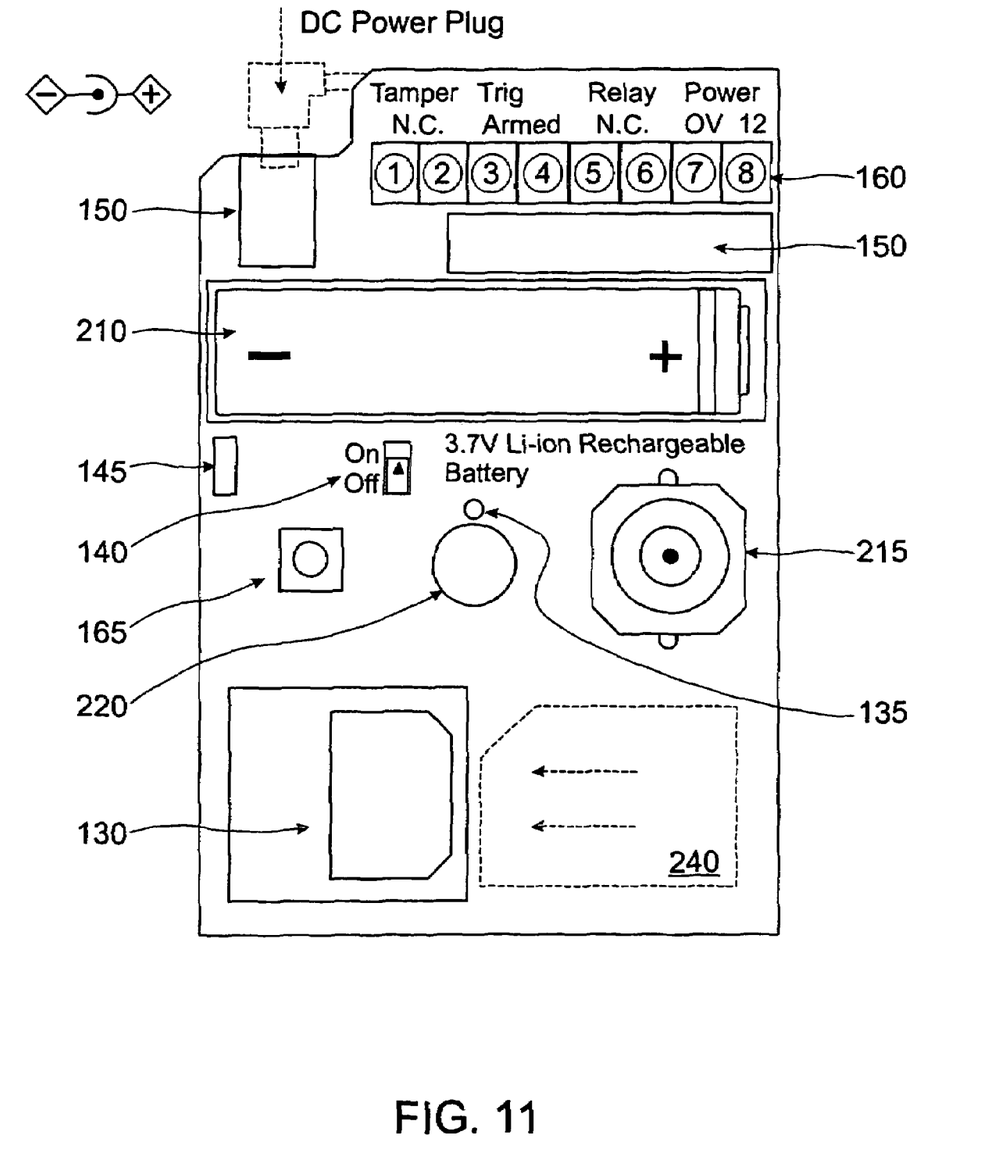
FIG. 11 is a schematic block diagram illustrating the components of a single camera unit according to an embodiment of the present invention.

Referring to FIG. 11, there is a schematic diagram illustrating the components of a single camera unit 110 according to a further embodiment of the present invention, wherein the camera unit 110 is designed to work either through a wired connection to an existing alarm system or as a standalone system. The camera unit 110 depicted in FIG. 11 does not include the RF transceiver 225 and antenna 230 shown in FIG. 2; rather all image data captured through the image sensor 215 is transferred only to the removable memory card 240 through a memory card socket 130. Other features of the standalone camera unit 110 include a status LED 135, an on/off switch 140, a tamper switch 145, a DC power socket 150, and an infra red receiver 165 for a remote control. The standalone camera unit 110 can thus be installed easily in any location without the need for any connection—wireless or wired—to a larger system. For example, a plurality of standalone units 110 can be installed in different rooms of a house that does not have an existing security system. Also, standalone units 110 can be installed in remote locations such as sheds or outdoor areas where mains power and wired or wireless connections to other systems are inconvenient or prohibitively expensive. In such situations the standalone unit 110 proceeds to operate as described above; however no transmission of image data is made from the standalone unit 110. Instead, when a user seeks to inspect images captured from a standalone unit 110, the images can be retrieved by manually removing the removable memory card 240 and downloading any captured images to a viewer such as a computer or personal digital assistant.

Another advantage of certain embodiments of the standalone camera unit 110 is a relay 155 and terminal block 160, which enable the standalone unit 110 to simply and inexpensively replace existing motion detectors that form part of a conventional security system. That means that owners of conventional security systems that include only motion sensors without video or photographic capabilities, can easily upgrade their systems to include a standalone camera unit 110, but without the need to replace their entire systems.

For example, many homeowners own inexpensive alarm systems that include several motion sensors and a control box that is hardwired to a central security company through the public switched telephone network. Using the standalone camera units 110 of the present invention, such systems can be upgraded by simply replacing each individual motion sensor of the existing security system with a standalone camera unit 110. The terminal block 160 enables the wires to the existing motion sensor to be plugged directly into the standalone camera unit 110. The security system then works exactly as it did before the upgrade, but with the added feature of having an image sensor 215 capturing images whenever the motion sensor 220 is triggered. In addition to triggering the image sensor 215, the motion sensor 220 still triggers an alarm in the control box that can be communicated to the security company. Those skilled in the art will recognize, therefore, that a valuable feature of the standalone units 110 is the ability to upgrade existing systems in a modular fashion, where existing motion detectors are replaced with the standalone camera units 110 only when it is convenient and economical to do so.

Figure 12:
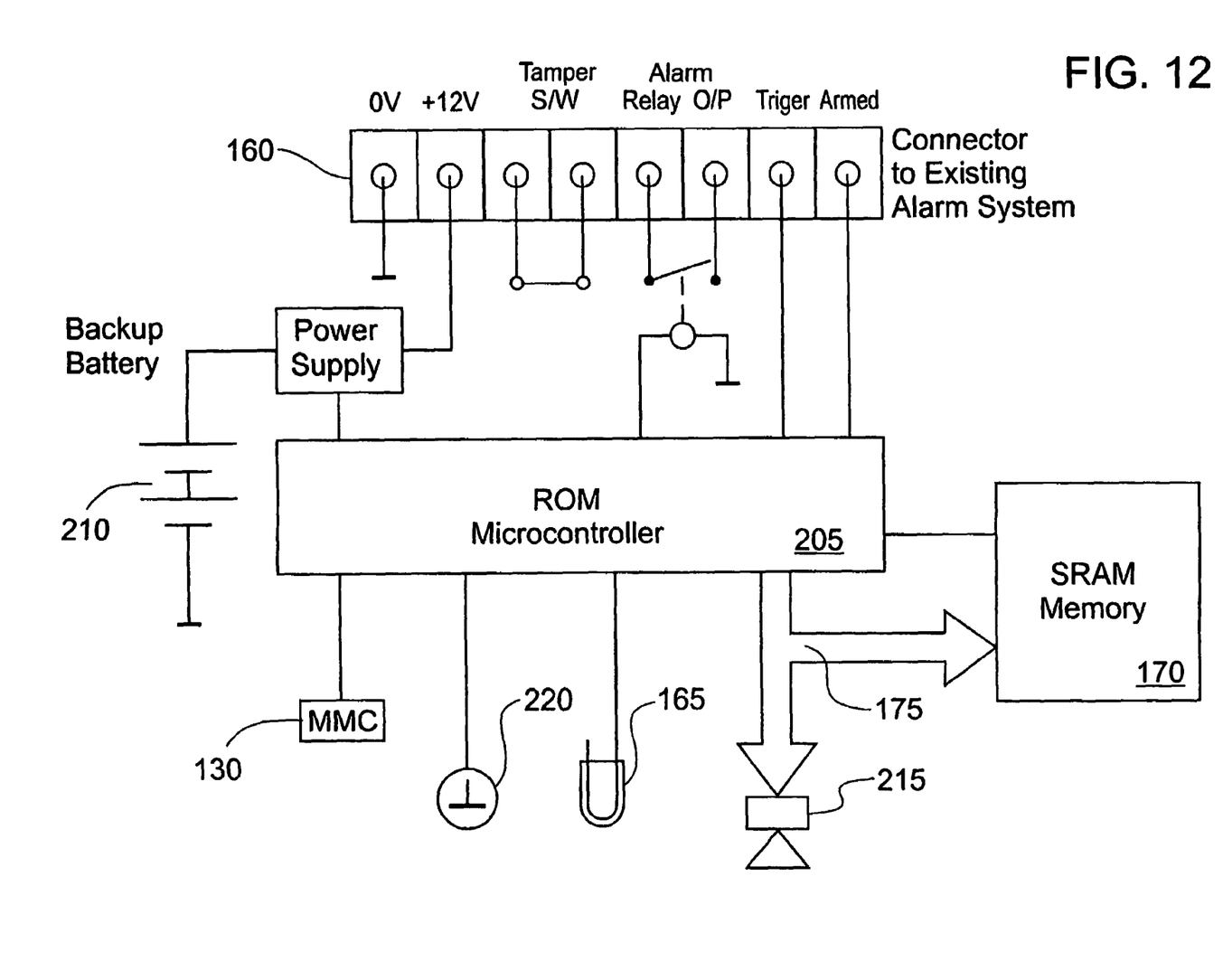
FIG. 12 is a schematic block diagram illustrating further elements of a circuit layout of a camera unit according to an embodiment of the present invention.

Referring to FIG. 12 there is a further schematic diagram illustrating elements of the circuit layout of a camera unit 110, including an SRAM memory 170 that is connected to the image sensor 215 through the high-speed DMA bus 175.

Figure 13:
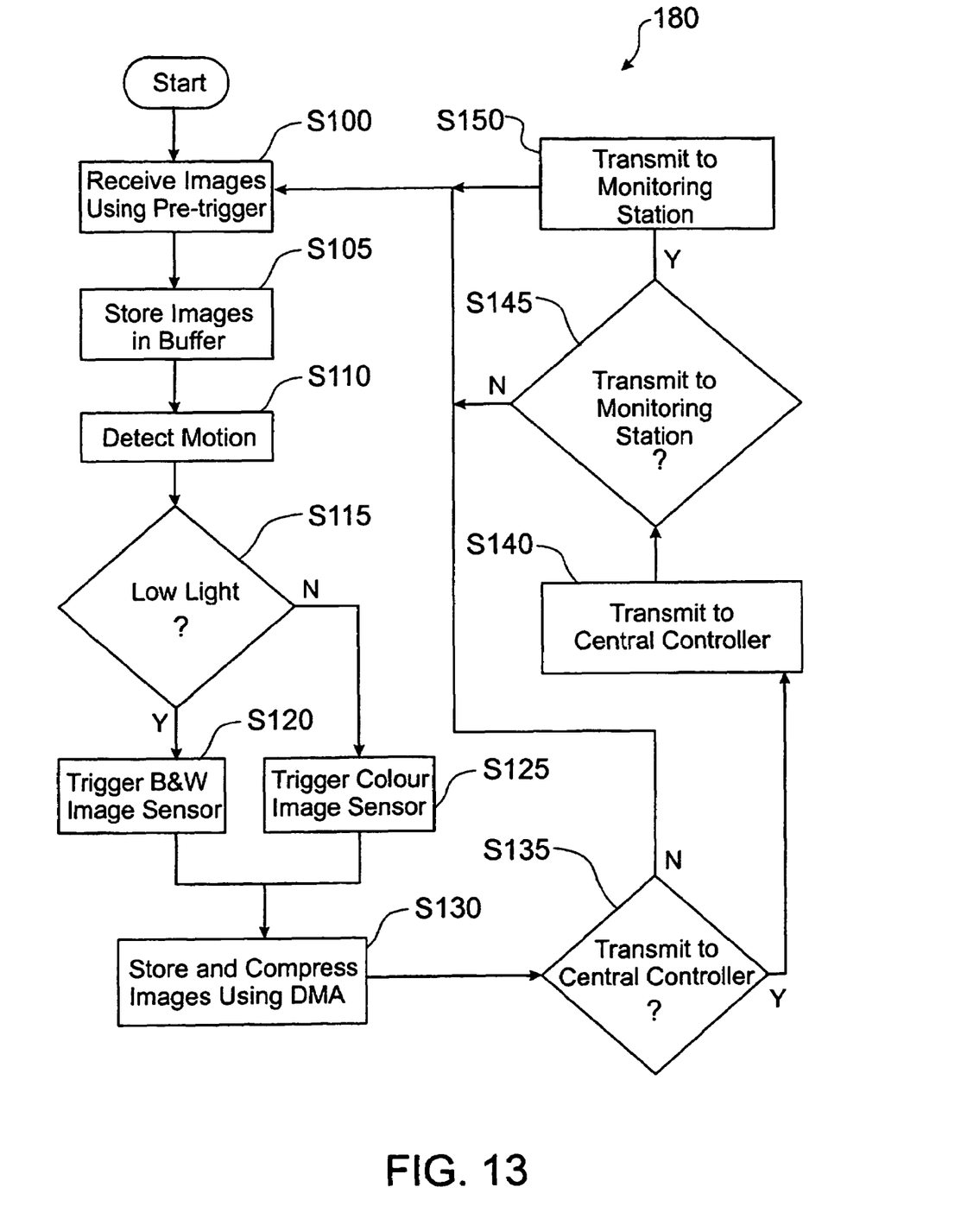
FIG. 13 is a flow diagram illustrating a method for image monitoring using a plurality of camera units operatively connected to each other and to a central controller using wireless communications according to an embodiment of the present invention.

Finally, referring to FIG. 13, there is a flow diagram illustrating a method 180 for image monitoring using a plurality of camera units 110 operatively connected to each other and to a central controller 105 using wireless communications. The method 180 begins at step S100 where pre-trigger images are received continuously from the image sensor 215. Depending on the lighting conditions, the pre-trigger images may be received from either a black and white image sensor 245 or a colour image sensor 215. The pre-trigger images are then stored at step S105 in a memory buffer. Next, at step S110 the motion of a moving object is detected using a motion detector 220 included in at least one of the camera units 110. Where the system 100 includes a low-light black and white image sensor 245, at step S115 it is determined whether low light conditions exist that require use of the black and white image sensor 245. If so, then at step S120 the black and white image sensor 245 is triggered; otherwise at step S125 a colour image sensor 215 is triggered. Received images are then stored at step S130, preferably using DMA so as to conserve power.

The method 180 then continues at step S135 where it is determined whether the stored images should be transmitted to a central controller 105. If so then the images are transmitted to the central controller 105 at step S140. If not then the method 180 returns to step S100 where new pre-trigger images continue to be received by the appropriate image sensors 215, 245. If images are transmitted to the central controller 105, then at step S145 the central controller 105 determines whether the images should be transmitted to a monitoring station 115. If so then at step S150 the images are transmitted to the monitoring station 115 where further decisions can be made such as whether to contact authorities 125 such as the police. Otherwise the system 100 again continues receiving pre-trigger images at step S100.

The present invention is therefore a system and method for image monitoring that may be used as an improved security system 100. The system 100 obtains automatic, sequential digital still images to determine whether an anomalous event, such as a security breach, has occurred. The system 100 may further include sophisticated filtering processes that both a) minimize false alarms reported to authorities 125 and b) reduce costs by centralizing more expensive analysis hardware and resources and distributing less expensive analysis hardware and resources. Finally, the camera units 110 may be used as standalone image monitoring devices for monitoring remote areas or as convenient and low cost upgrades of prior art motion detectors installed in existing security systems.

The above detailed description provides preferred exemplary embodiments only, and is not intended to limit the scope, applicability, or configuration of the present invention. Rather, the detailed description of the preferred exemplary embodiments provides those skilled in the art with an enabling description for implementing the preferred exemplary embodiments of the invention. It should be understood that various changes may be made in the function and arrangement of elements and steps without departing from the spirit and scope of the invention as set forth in the appended claims.

The invention claimed is:

1. An image monitoring system comprising:
    a central controller; and
    a plurality of digital still camera units operatively connected to the central controller, wherein at least one of the camera units comprises
        an image sensor;
        a motion detector operatively connected to the image sensor that causes the image sensor to receive digital still image data when motion is detected;
        a micro controller operatively connected to the image sensor and to the motion detector;
        a first nonvolatile memory operatively connected to or included in the micro controller; and
        computer readable program code stored on the first memory for causing the micro controller to determine whether the digital still image data should be transmitted to the central controller, wherein the central controller then determines whether the digital still image data should be transmitted to a monitoring station;
    wherein at least one of the camera units includes a pre-trigger feature that, following a detection of motion by the motion detector, transmits to the central controller a series of buffered digital still images captured before the detection of motion.

2. The image monitoring system of claim 1, wherein the plurality of camera units transmit the digital still image data wirelessly to the central controller.

3. The image monitoring system of claim 2, wherein the central controller further comprises a mesh networking protocol enabling the digital still image data to be routed indirectly and wirelessly through one or more of the camera units to the central controller.

4. The image monitoring system of claim 1, wherein at least one of the camera units further comprises a microphone.

5. The image monitoring system of claim 1, wherein at least one of the camera units further comprises both a color image sensor and a black and white image sensor to improve low-light sensitivity, wherein both image sensors are operatively connected to a single high-speed DMA bus.

6. The image monitoring system of claim 1, wherein at least one of the camera units is battery operated and comprises direct memory access circuitry between an image sensor and a second nonvolatile memory.

7. The image monitoring system of claim 1, wherein the monitoring station forms a component of the image monitoring system, and wherein the monitoring station includes human personnel who further analyze the images to determine whether an alarm should be sent to an authority.

8. A method for image monitoring using a plurality of digital still camera units operatively connected to each other and to a central controller using wireless communications, the method comprising the steps of:
    detecting motion of a moving object using a motion detector included in at least one of the camera units;
    triggering the transmission of a series of digital still images from the memory buffer to a central controller following the detection of motion of the moving object, the series of digital still images including digital still images received before the detection of motion;
    determining whether the series of digital still images should be transmitted wirelessly to the central controller by analyzing the series of digital still images using a micro controller included in at least one of the camera units and operatively connected to the image sensor;
    determining whether a digital still image received at the central controller from said at least one of the camera units should be transmitted to a monitoring station;
    wherein at least one of the camera units includes a pre-trigger feature including the steps of continuously receiving digital still images from the image sensor, storing the digital still images in a memory buffer of at least one camera units, and following a detection of motion by the motion detector, transmitting to the central controller a series of the digital still images received before the detection of motion.

9. The method for image monitoring of claim 8, wherein the central controller further comprises a mesh networking protocol enabling image data to be routed indirectly and wirelessly through one or more of the camera units to the central controller.

10. The method for image monitoring of claim 8, further comprising the step of storing images received by the image sensor in a memory unit of a camera unit using direct memory access.

11. The method for image monitoring of claim 10, wherein the step of triggering an image sensor comprises triggering a black and white image sensor in low light conditions, and otherwise triggering a color image sensor, wherein at least one camera unit includes both the color image sensor and the black and white image sensor operatively connected to a single high-speed DMA bus.

* * * * *